United States Patent Office 2,934,697
Patented Apr. 26, 1960

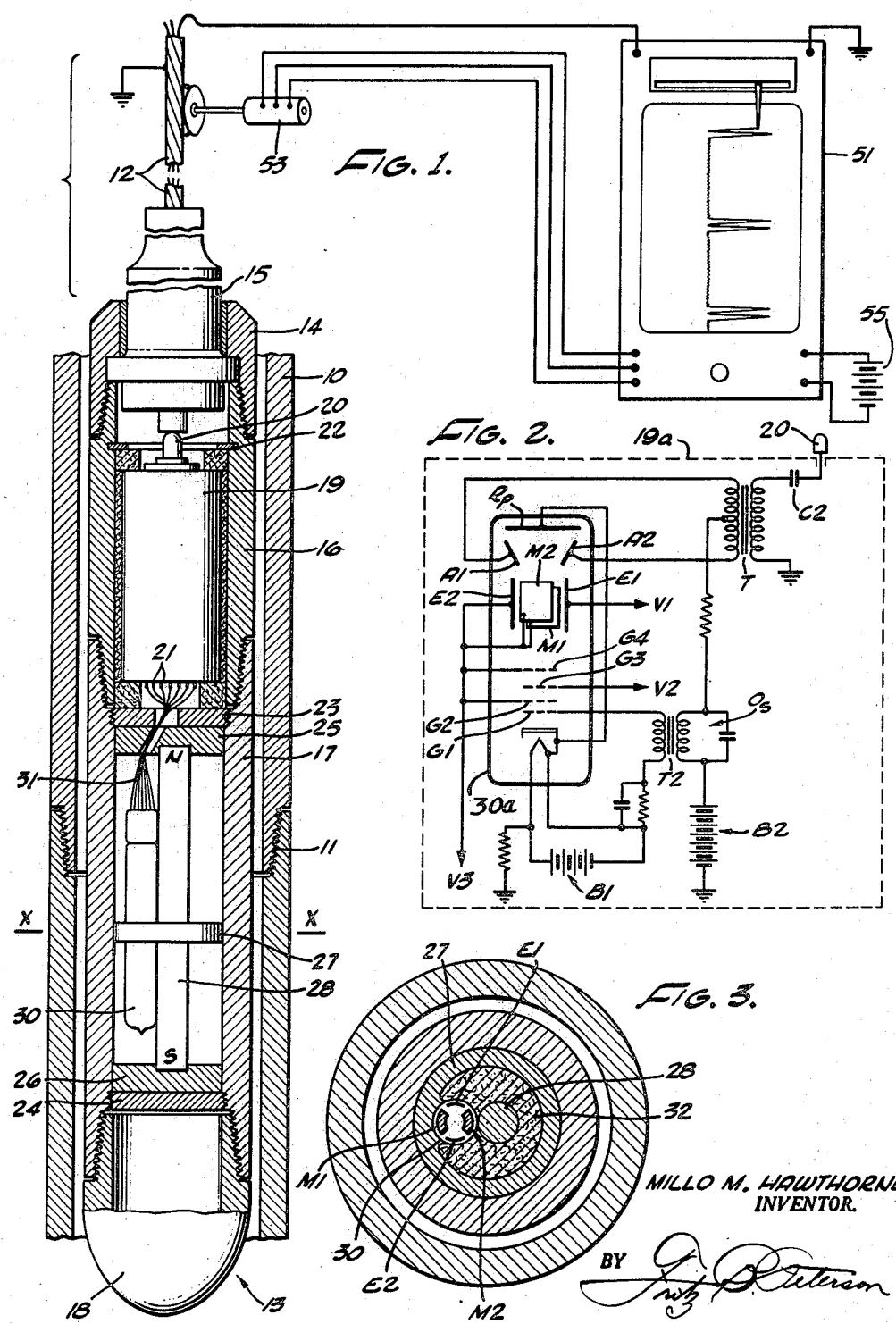

2,934,697

EARTH WELL TUBING ANOMALY DETECTOR

Millo M. Hawthorne, Houston, Tex., assignor, by mesne assignments, to Dresser Industries, Inc., Dallas, Tex., a corporation of Delaware Application April 12, 1955, Serial No. 500,863

11 Claims. (Cl. 324—37)

The present invention relates to means for indicating or detecting, in tubular structures in earth boreholes, discontinuities such as joints, collars, rings or other types of markers, and other discontinuities therein of a magnetic nature. More particularly, the present invention is directed to means capable of providing indications of such discontinuities in tubing or casing independent of movement thereof in such tubing or casing and while out of contact with the latter.

There have been heretofore proposed means for indicating tubing discontinuities or joints having smooth surfaces; however, these prior art structures have been unable to furnish an indication of a tubing discontinuity in absence of relative motion and/or contact between the tubing and indicating or detecting apparatus. It is, therefore, a principal object of the present invention to provide a well tubing discontinuity indicating means capable of providing a signal indicating a smooth joint or discontinuity in a well tubing while stationarily positioned in the tubing out of contact with the latter, as well as being capable of providing a signal indicating other types of discontinuities in tubing such as breaks, markers and collars, both while being traversed past such discontinuity and while stationarily located thereadjacent, whether in contact with the tubing or not.

It is another object of the invention to provide a tubing discontinuity detecting means capable of locating a tubing discontinuity with great accuracy.

It is another object of the invention to provide a tubing discontinuity indicating means capable of indicating a tubing discontinuity with great accuracy while being held in a given position in such tubing.

It is another object of the invention to provide a tubing discontinuity indicating means capable of continuously providing a discontinuity indicating signal when stationarily positioned within the tubing and out of contact with the latter.

Other objects and advantages of the present invention will hereinafter be made apparent or stated in connection with the following description of a preferred embodiment of apparatus incorporating the principles of the invention and of a preferred method according to the invention, in conjunction with the accompanying drawings in which like or similar parts bear like or similar reference numerals and in which, Figure 1 is a partly schematic diagram illustrating apparatus according to the invention, certain parts being illustrated in conventional form and partly in section, and certain elements removed in the interest of clarity of illustration;

Figure 2 is an electrical circuit diagram diagrammatically illustrating certain electrical parts of the apparatus shown in Figure 1; and Figure 3 is a sectional view of apparatus depicted partly in section in Figure 1, and taken along a sectioning line at an elevation indicated at X—X in Figure 1, with some parts omitted in the interest of clarity.

Referring now to the drawings, and more particularly to Figure 1, there is shown a sectioned fragment of a well tubing 10 having a discontinuity in the form of a joint 11 of the type providing a smooth, relatively uninterrupted interior surface. It will be understood that the discontinuity presented by tubing 10 could be any of several other types, as, for example, that caused by a coupling or collar of conventional type, a circumferentially extending band encircling the casing, or a magnetic anomaly such as would be provided by perforations or magnetic materials in the form of magnetic markers applied to or placed near the tubing. The tubing discontinuity formed by joint 11 is selected for purposes of illustration with respect to the present invention since it presents perhaps the most difficult type of discontinuity to detect by presently known discontinuity detecting means. Shown suspended within tubing 10 by means of a conventional multi-conductor suspension cable 12 is a plural-section generally cylindrical container 13 comprised in part of an upper supporting collar 14 in which is secured and sealed a conventional cable head 15 which serves to anchor and terminate the cable 12. Threadably joined and supported by collar 14 are intermediate and lower container sections 16 and 17, the latter of which is constructed of nonmagnetic material and which at its lower end is arranged to support alternatively other apparatus hereinafter to be more specifically described, or a bullhead 18. The several threaded joints are suitably sealed in known manner. It will be understood that the upper and central sections of container 13 are of generally tubular construction and that the container is of diametral dimension such as to permit free traversal through the tubing 10. Suitably cushioned and mounted within the upper container section 16 is a hermetically sealed apparatus case 19 having at its upper end a sealed yielding electrical contact means 20 suitably insulated from the case and having at its lower end a plurality of sealed insulated terminals 21, all as indicated. Apparatus case 19 is cushioned at both ends by suitable annular cushion members, and is preferably also encircled by a generally tubular cushion, as indicated. Undue upward movement of the apparatus case within section 16 is preferably prevented, as by an internal lock ring 22 secured in an internal annular recess formed in section 16. Apparatus case 19 is provided to house in suitable fashion electrical and electronic apparatus, the circuit diagram of which is shown enclosed with other apparatus in the dashed-line rectangle 19a of Figure 2. The housed apparatus may be potted or mounted in other suitable manner. Securely mounted and positioned in nonmagnetic section 17 of container 13 between threaded nonmagnetic disc-shaped plug members 23 and 24, the upper of which is perforated as indicated, is a novel magnetic structure whose construction and operation are hereinafter more fully explained.

The hereinbefore-mentioned magnetic structure generally contained within section 17 of container 13 comprises an upper pole piece 25 of ferromagnetic material formed as a recessed and perforated disc as indicated, a lower ferromagnetic pole piece 26 similarly formed as a recessed disc, an intermediate annular shaped pole piece 27, and a longitudinally disposed permanent magnet 28 fitted in the recesses of pole pieces 25 and 26 and securely clamped therebetween by means of the plug members 23 and 24 which are screwed into interiorly threaded portions of container section 17 as indicated. Plug members 23 and 24 are preferably formed of nonmagnetic material for reasons self-evident and hereinafter made fully apparent. Pole pieces 25, 26 and 27 are preferably made of ferromagnet material of high permeability. Permanent magnet 28 is preferably formed from one of the alloys providing suitable mechanical strength and great magnetomotive force which is retained over a long period of time. Intermediate pole piece 27 is of generally ring-shaped configuration, but having a special internal shape more fully depicted in Figure 3, for reasons hereinafter made apparent. As indicated in Figure 1 and 3, permanent magnet 28 extends through the interior of pole piece 27 and is so positioned by the recesses in pole pieces 25 and 26 as to be spaced away from pole piece 27 in a radial sense. Also extending through the interior of intermediate pole piece 27 and substantially encircled thereby and longitudinally positioned substantially in contact with permanent magnet 28 and also substantially in contact with a specially formed interior portion of pole piece 27 is an electron tube means 30 of somewhat special form and constructed and disposed in a manner hereinafter more fully explained. Electron tube means 30, which may be of or similar to the National Union Radio Corporation type R2211 magnetic pickup tube, is provided with a plurality of insulated conductors indicated generally at 31 which extend as indicated through perforations in pole pieces 25 and plug 23 to the aforementioned lower insulated terminals 21 of apparatus case 19. The space within container section 17 between pole pieces 25 and 26 not occupied by pole piece 27 and electron tube means 30 and its leads 31 may be, and preferably is, filled with a suitable nonmagnetic insulating material, such as one of the foamed plastics now well known in the arts. This space-filling material, designated by the reference numeral 32 in Figure 3, has been omitted from Figure 1 in the interest of clarity of illustration.

The magnetic structure or means comprising pole pieces 25, 26 and 27 and the field-producing permanent magnet 28 is arranged and intended to produce in a surrounding region a magnetic field having a flux path which becomes distorted from a substantially normal state or condition to a variable and substantially abnormal condition or state as the magnetic structure closely approaches and traverses past a magnetic anomaly or discontinuity in the well tubing. When the magnetic structure is located relatively distantly from the magnetic anomaly or discontinuity in the well tubing the flux path is principally directed through the magnet 28 from one of its poles to its opposite pole, thence generally outwardly through one of the pole pieces 25 and 26, outwardly into and through the encircling ferromagnetic well tubing, thence through a longitudinally extending portion of such tubing and inwardly from the tubing through the nonmagnetic section 17 into the opposite pole piece and the other end of the permanent magnet. This corresponds to the aforementioned normal state or condition of the magnetic flux path. However, as the magnetic structure closely approaches a discontinuity or magnetic anomaly in the encircling tubing, a distortion is introduced into the magnetic field and the flux path by the discontinuity. This distortion will cause a certain amount of the magnetic flux to shift and to exist in or return through pole piece 27 to an intermediate portion of permanent magnet 28 and then to one or the other of the poles of the permanent magnet. As the intermediate pole piece 27 approaches the discontinuity in the well tubing from one direction, this distortion of the magnetic flux path will be in one direction, whereas, if the approach of the pole piece 27 is from the other direction the distortion of the magnetic flux path will be in an opposite direction; that is to say, when the approach toward the magnetic anomaly is in one direction the magnetic flux will return to the south pole of the magnet via pole piece 27; whereas, if the approach is from the opposite direction, return of flux through pole piece 27 will be to the north pole of the permanent magnet. Thus during operation of the magnetic structure the flux created by the permanent magnet may be said to be in or to assume two different states or conditions, namely, and first, an abnormal state or condition in which the flux through pole piece 27 rapidly increases from a substantially minimum value to a maximum value in one direction, then decreases through zero value and increases to a maximum value in an opposite direction and then again decreases to a substantially minimum value, as the magnetic structure is traversed past a magnetic anomaly or discontinuity in or adjacent the well tubing; and second, the normal state. The second or normal state or condition of the magnetic flux may be defined as that which exists or obtains when the magnetic means is positioned within a ferromagnetic well tubing but remote from any magnetic anomaly or discontinuity in the tubing. The extent or degree of distortion of the magnetic flux path will, as is evident, vary considerably in accordance with the type of magnetic anomaly or discontinuity in the well tubing. A discontinuity such as a conventional tubing collar type joint will produce considerable distortion of the magnetic flux path, whereas a tightly joined, threaded tubing joint of the type illustrated in Figure 1 will probably produce a minimum amount of distortion. It is evident, however, that any type of joint, as well as any type of magnetic marker or ferromagnetic collar means in or adjacent the tubing will introduce a change in the reluctance of the magnetic flux path as the magnetic means is traversed past the magnetic anomaly. Generally, but not in all cases, this change in the reluctance of the magnetic flux path will assume the form of an increase in reluctance. In certain relatively rare instances a decrease in reluctance will be effected. In either event, as the centrally located magnetic pole piece 27 approaches the discontinuity or anomaly, the change in reluctance of the path will cause a certain amount of the magnetic flux to pass through pole piece 27 and into a centrally located portion of the permanent magnet 28. It is evident that as the pole piece 27 passes the discontinuity the direction of the flux existing in the pole piece 27 will reverse, and in reversing, the value of the magnetic flux passes through zero. In general, in absence of other influencing factors, the position in which the flux in pole piece 27 is at a zero value is between and practically equidistant from those positions in which the flux in pole piece 27 is at a maximum as the magnetic structure is traversed past the anomaly.

The hereinbefore-mentioned states or conditions of the magnetic flux path are utilized in and by the present invention to provide an indication of the location of the magnetic anomaly or tubing discontinuity with respect to pole pieces 27, as will be presently explained.

The electron tube means 30 is preferably of a construction shown diagrammatically in Figure 2, and of miniature or subminiature size. The electron tube, designated 30a in the circuit diagram of Figure 2, comprises a miniature electron gun including a cathode means, electron beam control grids or electrodes, electrostatic deflection plates, magnetic pole pieces or deflection plates for deflecting the electron beam magnetically, an electron beam repelling plate, and a pair of electron collector plates or anodes. As diagrammatically illustrated in Figure 2, the electron tube has situated at its base end a heater element suitably arranged to activate an electron-emitting cathode, the electron flow from which is formed into a beam and controlled in magnitude of flow by a first grid or electrode G1, electron beam accelerator and control grids G2 and G4, and a focusing electrode G3. The electron beam is directed between a pair of magnetic deflection plates M1 and M2, and through a pair of electrostatic deflection plates E1 and E2, and is collected on one or both of collector plates A1 and A2 to which anodes the electron beam is attracted by a suitable applied potential and is repelled by a repeller plate R$p$ which is internally connected to the cathode as indicated. The presence of a potential between electrodes E1 and E2 causes an electrostatic deflection of the beam of electrons in a well known manner, and similarly, existence of magnetic flux passing through and between plates M1 and M2 causes a deflection of the electron beam toward one or the other of plates A1 and A2. In the absence of a deflection potential applied to plates E1 and E2, and in the absence of magnetic flux in a path through or between magnetic deflection plates M1 and M2, and with a proper potential upon control electrode G1 and focusing electrode G3, an electron beam emitted by the cathode will be focused at some axial point between the deflecting electrodes and collecting electrodes A1 and A2, and the electron beam will divide substantially equally between the latter two electrodes, partly due to the attraction of the potential on electrodes A1 and A2, and partly due to the repelling effect of the potential applied to repelling plate Rp. Under this just-described circumstance, the current flowing between the balanced halves of the primary of output transformer T, to which plates A1 and A2 are connected as indicated, will be equal, and no appreciable voltage will be induced in the secondary of the transformer. The latter is true, even though the output current passing through the center tap connection of the transformer primary is pulsating in character, as it may be in a manner hereinafter described. In the presence of a deflecting potential applied between deflection electrodes E1 and E2, the electron beam becomes unequally divided and a greater portion of the electron stream is collected by one or the other of electrodes A1 and A2. Similarly, the existence of a magnetic field having lines of force passing through and between magnetic deflection plates M1 and M2 will result in an unequal distribution or division of the electron stream between collector plates A1 and A2. The potentials applied to the several electrodes of the electron tube means as it is used in the preferred form of the present invention are such that, in the absence of a magnetic field causing magnetic flux between magnetic deflecting plates M1 and M2, the electron beam is divided equally between collector plates A1 and A2. Heater current is applied to the filament of the cathode of the tube by means including a battery B1 as illustrated, and collector plate or electrode potential is supplied to plates A1 and A2 through the midpoint tap of the primary of transformer T by way of an oscillatory circuit Os, by a battery or other source B2. Other potentials, V1, V2 and V3, as indicated in Figure 2, are applied and may be of values, for example, dictated by good electronic design practice and as indicated by the tube employed. Control grid G1 has applied to it a potential derived from the output of the electron tube through a coupling to oscillatory circuit Os. To this end a portion at least of the inductive reactance of oscillatory circuit Os is supplied by the primary of a transformer T2 whose secondary is connected to control grid or electrode G1 and the cathode of the electron tube as indicated. By virtue of this coupling of the oscillatory circuit with the circuit of G1, the electron beam will pulsate in magnitude, the pulsations setting up and sustaining oscillations in the oscillatory circuit which in turn through the action of control electrode G1 serves to continue the oscillations by pulsing the electron beam. The circuit constants are preferably so chosen and the circuit elements so adjusted that the oscillations set up and sustained are of a desired frequency, for example, 2,000 cycles per second, and the potentials are further such that, as previously mentioned, in the absence of a magnetic field existing through plates M1 and M2, division of the electron beam is equal with respect to collector plates A1 and A2. Under this balanced condition the secondary of transformer T will have induced in it substantially zero potential as is well known. This corresponds to the status of the equipment under the aforementioned normal condition (second state) of the magnetic flux in the magnetic means, as the latter is located in or moving through a portion of well tubing relatively nonadjacent to a tubing discontinuity. When the magnetic means closely approaches, passes and recedes from a tubing discontinuity, and the distortion of the magnetic flux path in the magnetic means occurs corresponding to the aforementioned first, or abnormal, state of flux distribution, that is, when magnetic flux is forced to exist in pole piece 27 and through and between plates M1 and M2, the distribution of the electron beam between anodes A1 and A2 becomes unbalanced or unequal. This unbalance of pulsating current flowing through the anodes and their respective halves of the primary of transformer T causes generation of an alternating potential across the secondary terminals of the transformer.

Electron tube means 30 is carefully positioned as indicated in Figures 1 and 3 with magnetic deflection plates M1 and M2 aligned between an intermediate portion of magnet 28 and the curved tube seat or saddle formed on the inner face of pole piece 27. With the electron tube thus positioned and secured as by means of the foamed plastic or filler material 32, and with the electric circuitry in operation, equal division of the electron beam will occur as long as no flux is forced to exist in the path through the plates M1 and M2. However, when flux is forced to exist in that path, as it will be in the aforementioned first state or condition when pole piece 27 is near a tubing discontinuity, the electron beam will be magnetically deflected toward one or the other of anodes A1 and A2, and a potential will be generated in the secondary of transformer T. This generated output potential of the transformer is employed as a signal which is transmitted from the apparatus housed in container 13 to a point outside tubing 10 by way of cable 12. To this end, one terminal of the secondary of transformer T is grounded as indicated, and the other terminal is connected by way of a capacitor C2 to the aforementioned contact 20 as indicated in Figure 2. The signal thus transferred to contact 20 travels by way of one of the selected conductors of cable 12 to a point outside tubing 10.

Cable 12 is arranged to support container 13 and/or other apparatus attached thereto and to traverse the same through tubing 10 in one direction by gravitational force and in the other direction by operating against said force. Any suitable winding or reeling means for the cable may be used. Thus in the case where tubing 10 is in the form of a well casing in a cased borehole and in which situation it is sometimes desirable to very accurately locate discontinuities in the casing, the apparatus supported by cable 12 may be lowered in casing 10 into operative position by a conventional reel hoist or other suitable means as is well known. As the apparatus is lowered in a well casing periodic pairs of alternating current signals of rising and falling intensity are created as pole piece 27 approaches and recedes from a discontinuity in the casing. These signals may be utilized in any suitable way, but as herein disclosed, and as preferred, are utilized in governing the action of the recorder pen of a graphical recorder whose record strip is moved in synchronism with the traversing movement of container 13 through the well casing, so as to secure an indication of the location of each discontinuity. To this end the signal applied to a conductor of cable 12 and transmitted to the exterior of casing 10 is applied by way of a conductor 50 to one input terminal of a recorder 51, the other terminal of which is grounded as indicated. The chart or graph paper moving means of recorder 51 are operated synchronously with cable 12 by suitable means such as, for example, by a synchromotor contained in the recorder 51 and suitably connected to and driven by a synchrogenerator 53 which is in turn driven by suitable connection with cable 12 as indicated in Figure 1. Power may be supplied to the recording apparatus including recorder 51 from a suitable power source indicated diagrammatically at 55 in Figure 1. It will be noted that the signal transmitted through the conductor of cable 12 is in the form of an alternating current of the frequency of the aforementioned oscillatory circuit, which frequency may vary over a certain range of frequencies as the inductive reactance of transformer T changes the inductive reactance of the oscillatory circuit as a whole as the electron beam division becomes unequal when the electron beam in tube 30a is deflected by the changed magnetic field in pole piece 27. As hereinabove explained, the signal voltage generated in the secondary of transformer T rises from substantially zero value to a maximum as intermediate pole piece 27 approaches a discontinuity in tubing 10, then drops again to substantially zero value as the magnetic flux in the pole piece 27 drops to zero value when the pole piece is positioned substantially opposite the discontinuity, again rises to a maximum value as the pole piece recedes from the discontinuity, and again falls to a substantially zero value when all of the pole pieces 25, 26 and 27 have passed by the discontinuity. Since the frequency of the oscillatory circuit and of the transmitted signal is preferably of the order of 2,000 cycles per second, it is preferred that the signal be demodulated prior to being applied to the recorder pen mechanism of recorder 51. To this end recorder 51 preferably includes in its apparatus a suitable detector or demodulator, including a rectifying means whereby there may be fed to the recording pen of the recorder a direct current representing one-half (for example, the positive half), of the envelope of the transmitted signal wave. The result of this is depicted on the record medium or paper of the recorder in Figure 1, a portion of the graph there shown representing the record of received signals transmitted by the apparatus in container 13 as the latter is traversed past a plurality of discontinuities in casing 10. It will be noticed from an examination of this graph that as each casing discontinuity is traversed there is formed on the graph a rapid rise followed by a rapid fall to substantially base or zero value, followed by a second rapid rise and a second rapid fall to substantially zero value, as would be anticipated from the previous description of operation of the device. It will be noted that it is unnecessary to traverse the apparatus housed in container 13 all the way past a discontinuity in the tubing in order to arrive at a complete evaluation of the precise location of the detected discontinuity, since mere approach thereto from either direction results in formation of a sharp rise in the graph, after which the apparatus may be moved slowly until the graph falls to zero value, indicating the location of the discontinuity. Through ordinary calibration procedures it may be determined, with respect to a given type of discontinuity in the casing or tubing, the exact location of the discontinuity with respect to intermediate pole piece 27, or with respect to any other particular point on or in container 13 at the time the transmitted signal falls to zero value. By this means then the invention provides means and a mode of operation whereby a juncture, discontinuity or magnetic anomaly in a casing or other well tubing may be located with great precision even though the casing at the juncture or discontinuity be perfectly smooth on its interior surface. In the manner previously explained, by ordinary calibration methods the location of intermediate pole piece 27 or any other desired portion of the container 15 with respect to a discontinuity or juncture such as 11 in casing 10, may be precisely determined when the transmitted signal is at its maximum value, as well as when it is at zero value. Further, it will be noted that the cable, container 13, and other apparatus therefrom supported, may be held stationary within the casing or tubing 10 with the discontinuity detecting or indicating apparatus in full operation and indicating exactly the location of the discontinuity within the casing with respect to a given measure of cable 12. Thus, it is not necessary to traverse the apparatus up and down through the well tubing in order to maintain an indication of the location of a discontinuity in the tubing. Also, it is evident that no part of the apparatus need be in contact with the tubing or casing at any time.

In another and alternative mode of operation of the apparatus, a potential is applied between plates E1 and E2 of the electron tube, the potential being of a selected value such as to cause a normally slightly unequal division of the electron beam between anodes A1 and A2. This causes unbalanced current flow in the primary of transformer T and the normal transmission of an A.C. signal of a certain value. This signal is detected at the recorder and graphically registered as a certain value above base or zero level. When the magnetic means closely approaches a discontinuity in the tubing through which it is being traversed, the electron beam will again be swept from one anode to the other and back, as before, with the resultant production of pips or departures on the graph as in the previously described mode of operation. The pips or discontinuities will, in the present mode of operation of the apparatus, not be of the same magnitude as those previously described. By suitable calibration, again, the graphical record furnishes a visual indication of the location of the magnetic means with respect to a tubing discontinuity. The presence of a signal of appreciable magnitude during intervals between joints or discontinuities, as the apparatus is traversing the tubing, furnishes evidence the apparatus is in operation; and the same is true when the apparatus is stationarily positioned in juxtaposition to a discontinuity. Only when the apparatus fails to function will the signal, and the graph, then fall to and remain at zero or base value.

From the description of the apparatus and its modes of operation it is seen that there has been provided a signal-producing means capable of producing a signal when furnished a magnetic condition, and a means which furnishes the required magnetic condition when fixedly or stationarily positioned within and out of contact with a well tubing at a smooth joint thereof, whereby the apparatus can furnish an indication, in the form of a signal, of the location of the apparatus in juxtaposed relation to the joint. Further it is seen that there are means for transmitting the signal from within the tubing to a location outside the tubing and for there providing an accurate graphical indication of the location of the apparatus within the tubing and of the location of any tubing joint with respect to the end or another joint of the tubing.

This application is in certain respects related to my copending application Serial No. 500,862 filed on even date herewith.

Thus it is seen that the aforementioned and other objects and advantages of the invention have been accomplished by the preferred embodiment of apparatus described and explained. It will be evident to those skilled in the art that modifications of the apparatus and mode of operation may readily be effected within the scope of the invention, and accordingly it is not desired to be limited to the specific details hereinabove disclosed, but what is claimed is:

1. A well tubing discontinuity indicator component comprising, in combination: a magnet, a pair of end pole pieces for said magnet and a third intermediately located and generally annular pole piece substantially encircling but spaced from said magnet between said pair of pole pieces; and an electron tube means substantially encircled by said annular pole piece and having means including an electron gun for producing an electron beam, electron beam collector electrode means, and a pair of magnetic electron beam deflecting plates positioned closely adjacent and between a portion of said annular pole piece and said magnet said electron beam being directed between said deflecting plates, whereby variations of magnetic flux through said third pole piece will produce corresponding variations in magnetic flux between said deflecting plates to variably deflect such electron beam flowing from said gun to said beam collecting electrode means to correspondingly vary the output of said electrode means.

2. Detector apparatus adapted to be run into a well borehole comprising: means for inducing magnetic flux to flow in a closed flux path having an interior portion within said apparatus and an exterior portion outside of said apparatus, thereby to include within such exterior portion materials surrounding said apparatus when said apparatus is located in such borehole, the said closed flux path being such that the interior portion of said flux path is changeable under the influence of changes of said exterior portion of said flux path as influenced by such materials introduced into such exterior portion of said flux path; means for producing an electron beam directed in a path to be intersected by magnetic flux resulting from changes in said interior portion of said flux path as aforesaid, said electron beam being thereby adapted to be deflected from said path upon occurrence of such changes of such flux path; and means responsive to such deflection of said electron beam for producing a signal indicative of the occurrence of such deflection.

3. Detector apparatus adapted to be run into a well borehole for indicating locations with respect to depth of magnetic variations therein, comprising: constant polarity and substantially constant magnitude, magnetomotive force means for inducing magnetic flux to flow in a closed flux path, which includes an interior portion within said apparatus and an exterior portion outside of said apparatus, said exterior portion thereby being adapted to include material surrounding said apparatus when said apparatus is located in such borehole, said flux path being such that the interior portion of said flux path is changeable under the influence of the presence or absence of variations in magnetic properties of material included in such exterior portion of said flux path; means for producing an electron beam directed in a path to be intersected by magnetic flux resulting from changes in said interior portion of said flux path as aforesaid, said electron beam being thereby adapted to be deflected from said path upon occurrence of such changes of such flux path; and means responsive to such deflection of said electron beam for producing an electric signal indicative of the occurrence of such deflection.

4. Detector apparatus adapted to be run into a well borehole for indicating locations with respect to depth of magnetic anomalies therein, comprising: means for inducing magnetic flux to flow in a closed flux path which includes an interior portion within said apparatus and an exterior portion outside of said apparatus, thereby to include within said exterior portion material surrounding said apparatus when said apparatus is located in such borehole, said flux path being such that the said interior portion of said flux path is changeable under the influence of changes of said exterior portion of said flux path resulting from different magnetic properties of different material included in such exterior portion of said flux path; means for producing an electron beam directed in a path to be intersected by magnetic flux resulting from changes in said flux path as aforesaid, said electron beam being thereby adapted to be deflected from said path upon occurrence of such changes of said flux path; and a collector electrode means positioned adjacent a portion of said path of said electron beam such as to receive electrons therefrom varying in number in accordance with the magnitude of such deflection of said electron beam, thereby to produce a corresponding electric signal on said collector electrode.

5. Detector apparatus adapted to be run into a well borehole for indicating locations with respect to depth of magnetic variations therein, comprising: constant polarity, substantially constant magnitude, magnetomotive force means for inducing magnetic flux to flow in a closed path which includes an interior portion within said apparatus and an exterior portion outside of said apparatus, thereby to include within said exterior portion material surrounding said apparatus when said apparatus is located in such borehole, said closed flux path being such that the said interior portion of said flux path is at least in part changeable in location under the influence of changes in said exterior portion of said flux path resulting from different magnetic properties of different material present in such exterior portion of said flux path; means for producing an electron beam directed in a path to be intersected by magnetic flux resulting from changes in location of said flux path as aforesaid, said electron beam being thereby adapted to be deflected from said path on occurrence of such change in location of said flux path; and a collector electrode means positioned adjacent a portion of said path of said electron beam such as to receive electrons therefrom varying in number in accordance with the magnitude of such deflection of said electron beam, thereby to produce a corresponding electric signal on said collector electrode; and means to correlate the occurrence of said electric signal with the location of said apparatus in such borehole.

6. Detector apparatus adapted to be run into a well borehole for indicating locations with respect to depth of magnetic variations therein, comprising: constant polarity, substantially constant magnitude magnetomotive force means for inducing magnetic flux to flow in a closed flux path which includes an interior portion within said apparatus and an exterior portion outside of said apparatus, thereby to include within said exterior portion material surrounding said apparatus when said apparatus is located in such borehole, the said flux path being such that said interior portion of said flux path is at least in part changeable in location and polarity under the influence of changes in magnetic properties of the material present in different portions of such exterior portion of said flux path; means for producing an electron beam directed in a path to be intersected by magnetic flux resulting from such changes in location and polarity of said flux path as aforesaid, said electron beam thereby adapted to be deflected from said path upon occurrence of such changes; and a collector electrode means positioned adjacent a portion of said path of said electron beam such as to receive electrons therefrom varying in number in accordance with the magnitude of such deflection of said electron beam, thereby to produce a corresponding electric signal on said collector electrode; and means to correlate the occurrence of said electric signal with the location of said apparatus in such borehole.

7. Detector apparatus adapted to be run into a well borehole for indicating locations with respect to depth of magnetic variations therein, comprising: constant polarity, substantially constant magnitude magnetomotive force means for inducing magnetic flux to flow in a closed flux path which includes an interior portion within said apparatus and an exterior portion outside of said apparatus thereby to include within said exterior portion material surrounding said apparatus when said apparatus is located in such borehole, the said flux path being such that said interior portion of said flux path is at least in part changeable in location and polarity under the influence of changes in magnetic properties of the material present in different portions of such exterior portion of said flux path; means for producing a pulsating electron beam directed in a path to be intersected by magnetic flux resulting from changes in said flux path as aforesaid, said electron beam being thereby adapted to be deflected from said path upon occurrence of such changes of said flux path; and a collector electrode means positioned adjacent a portion of said path of said electron beam such as to receive electrons therefrom varying in number in accordance with the magnitude and direction of such deflection of said electron beam and in accordance with said pulsations, thereby to produce on said collector electrode means a pulsating electric signal varying in amplitude in accordance with said magnitude and direction of such deflection.

8. Detector apparatus adapted to be run into a well borehole for indicating locations with respect to depth of magnetic variations therein, comprising: means for inducing magnetic flux to flow in a closed flux path which includes an interior portion within said apparatus and an exterior portion outside of said apparatus thereby to include within such exterior portion material surrounding said apparatus, the said closed flux path being such that the interior portion of said flux path is changeable under the influence of changes of said exterior portion of said flux path resulting from different magnetic properties of different material present therein; means for producing a pulsating electron beam and means to direct said beam in a beam path to be intersected by magnetic flux resulting from changes in said flux path as aforesaid, said electron beam being thereby adapted to be deflected from said beam path upon occurrence of such changes of said flux path; a pair of spaced-apart collector electrode means positioned adjacent opposite sides of said beam path, each to receive a portion of said pulsating electron beam, such portion being variable in opposite phase, in accordance with variations in the magnitude and direction of such deflection of said electron beam from said beam path, thereby to produce separate pulsating electric signals on opposite ones of said collector electrode means which separate signals are thus variable simultaneously in amplitude in opposite phase with respect to one another; and means utilizing such separate, oppositely phased electric signals to produce therefrom a resultant pulsating signal having amplitudes related to the simultaneous relative amplitudes of said separate pulsating signals.

9. Detector apparatus adapted to be run into a well borehole for indicating locations with respect to depth of magnetic variations therein, comprising: magnet means providing a magnetomotive force of substantially constant magnitude and polarity positioned for emitting and receiving magnetic flux at first and second longitudinally spaced-apart locations in such apparatus; pole means spaced intermediate said first and second locations forming an intermediate flux path for emitting and receiving magnetic flux to and from an intermediate portion of said magnet means; electron discharge means for producing an electron stream directed along a path intersecting at least a portion of said intermediate flux path; and means responsive to deflection of said electron stream resulting from the intersection of said electron beam with magnetic flux in said intermediate flux path, for producing an electric signal indicative of such deflection.

10. Detector apparatus adapted to be run into a well borehole for indicating locations with respect to depth of magnetic variations therein, comprising: magnet means providing a magnetomotive force of substantially constant magnitude and constant polarity positioned for emitting and receiving magnetic flux at first and second longitudinally spaced-apart locations in such apparatus; pole means spaced intermediate said first and second locations forming an intermediate flux path for emitting and receiving magnetic flux to and from an intermediate portion of said magnet means; electron discharge means including a cathode, anode and control electrode and means to direct electrons flowing from said cathode in the form of a beam toward said anode; means providing feedback coupling between said anode and control electrode thereby to produce oscillations in said electron discharge means thereby to produce a pulsating anode-cathode current constituting said electron beam, means positioning said electron discharge means such as to direct such electron beam along a path intersecting at least a portion of said intermediate flux path; and means responsive to deflection of said electron beam resulting from the intersection of said electron beam with magnetic flux in said intermediate flux path, for producing a pulsating electric signal indicative of such deflection.

11. Detector apparatus adapted to be run into a well borehole for indicating locations with respect to depth of magnetic variations therein, comprising: means providing magnetomotive force of substantially constant magnitude and constant polarity positioned for emitting and receiving magnetic flux at first and second longitudinally spaced-apart locations in such apparatus; pole means spaced intermediate said first and second locations forming an intermediate flux path for emitting and receiving magnetic flux to and from an intermediate portion of said magnet means; electron discharge means including a cathode, a pair of spaced-apart anodes and control electrode, and means to direct electrons flowing from said cathode in the form of a beam between said spaced-apart anodes; means providing feedback coupling between said anodes and control electrode thereby to produce oscillations in said electron discharge means when energized, thereby to produce a pulsating anode-cathode current constituting said electron beam; means positioning said electron discharge means such as to direct such electron beam along a path intersecting at least a portion of said intermediate flux path; whereby such electron beam may be deflected toward one or the other of said anodes by said emitted or received magnetic flux, thereby to produce separate pulsating electrical signals on opposite ones of said anodes, which separate pulsating signals are thus variable simultaneously in amplitude, in opposite phase with respect to one another; and means utilizing such separate oppositely phased pulsating electric signals to produce therefrom a resultant signal having an amplitude related to the simultaneous relative amplitudes of said separate signals.

References Cited in the file of this patent

UNITED STATES PATENTS

| | | |
|---|---|---|
| 2,164,302 | Barnes et al. | July 4, 1939 |
| 2,371,176 | Kirk et al. | Mar. 13, 1945 |
| 2,470,828 | Millington et al. | May 24, 1949 |
| 2,535,666 | Broding | Dec. 26, 1950 |